Oct. 24, 1950   W. A. RAY   2,526,972
FLUID CONTROL VALVE
Filed Oct. 28, 1944
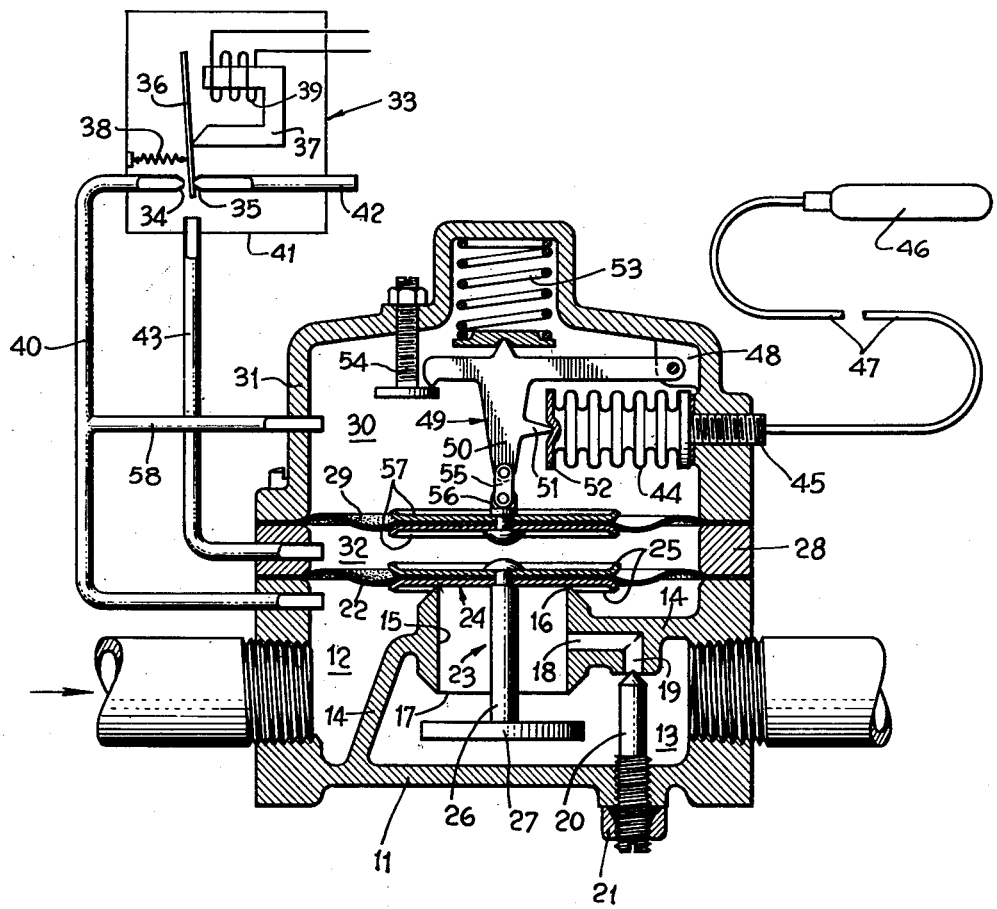
Inventor:
WILLIAM A. RAY,
By John H. Roase,
Attorney.

Patented Oct. 24, 1950

2,526,972

UNITED STATES PATENT OFFICE 2,526,972

FLUID CONTROL VALVE

William A. Ray, Los Angeles, Calif., assignor to General Controls Co., a corporation Application October 28, 1944, Serial No. 560,793

10 Claims. (Cl. 137—144)

My present invention relates to fluid control valves and to means for operating the same. While not so limited, this invention has particular utility in connection with valves of the type operated by fluid pressure and normally controlled by pilot-valve means. An example of a valve of the type particularly referred to is disclosed in U. S. Patent No. 2,317,639, granted to me April 27, 1943; a somewhat similar valve being disclosed in my copending application Serial No. 543,321, filed July 3, 1944, now U. S. Patent No. 2,477,897, granted Aug. 2, 1949. In these valves means are provided for producing either a full flow or a restricted flow of fluid so that, for example, when the valve is employed in connection with the control of a gas burner, a low-fire condition of the burner can be produced, as well as a high-fire condition and complete shut-off.

In the aforementioned application Serial No. 543,321 there is shown (in Fig. 4) a valve, operated by the inlet pressure of the fluid controlled thereby, the flow-controlling means of which comprises a closure carried by a flexible diaphragm and movable in a conventional manner (under the control of a pilot valve) between open and closed positions; mechanical means, movable gradually in response to variation of the magnitude of a controlling condition, also being provided for adjusting the extent of opening of the closure. In such an arrangement, variation of the inlet pressure has a tendency to effect variation of the flow-controlling position of the closure. It is therefore a main object of the present invention to avoid such deficiency by providing a valve, of the general character described, wherein variation of the inlet pressure has substantially no effect upon the flow-controlling means.

Another object of the invention is to provide a valve of the character described in the preceding object wherein, in the operation of the flow-controlling means by the condition-responsive means, the inlet pressure of the fluid controlled by the valve produces opposing forces on the flow-controlling means so that the same is substantially balanced and the force required to vary its position is therefore small.

Another object is to provide a valve wherein, upon initial opening, the flow-controlling means immediately assumes a position corresponding to that of the condition-responsive means.

Another object is to provide a novel and effective arrangement of means, operated by the condition-responsive means, for positioning the flow-controlling means.

Other objects and advantages of the invention will be found in the description, the drawing, and the claims; and, for full understanding of the invention, reference is to be had to the following detailed description and accompanying drawing, the single figure of which is a sectional view of a valve embodying the invention together with a schematic showing of a fluid control circuit therefor.

In the drawing, the numeral 11 indicates a valve casing having an inlet 12 and an outlet 13 separated by a partition 14 through which is a main opening 15. Formed at the upper end of the opening 15 is an inlet valve seat 16, and at its lower end an outlet seat 17. Branching horizontally from opening 15 intermediate the seats is a restricted opening 18, the vertical end portion 19 of which communicates with the outlet 13. Cooperable with the outlet end of the restricted opening, for regulating flow therethrough, is a conically-pointed rod 20 which is threaded in an opening through the bottom wall of the casing and sealingly locked in position by a gland nut 21.

A first flexible diaphragm 22, covering the open upper end of the valve casing, carries a closure member, generally indicated at 23, which comprises an upper closure 24 formed by a pair of disks 25 at opposite sides of the central portion of the diaphragm and secured thereto by the riveted-over top extremity of a rod 26 which carries at its lower end another closure 27; the closures 24 and 27 cooperating respectively with the inlet and outlet seats 16 and 17. Above the diaphragm 22, and spaced therefrom at its margin by an annular member 28, is a second flexible diaphragm 29; and covering the second diaphragm, so as to form a first pressure chamber 30, is a housing 31.

The opening and closing of the closure member 23 is controlled by varying the fluid pressure in the (second) chamber 32 between the diaphragms. For that purpose there is provided an electromagnetically-operated three-way pilot valve, schematically shown at 33, which comprises a pair of jets 34 and 35 with which an armature 36 cooperates. The armature is fulcrumed on the beveled end of one arm of a U-shaped electromagnet core 37 and is biased by a compression spring 38 into seating engagement with the jet 35. When the core is energized by passage of current through its coil winding 39 the armature is attracted out of engagement with jet 35 and into engagement with the other jet 34. The jet 34 is formed at one end of a pipe 40 which extends exteriorly of the pilot-valve housing 41 and communicates with the inlet 12 of the valve casing; the pipe 42 of the other jet 35 leading to the atmosphere. Another pipe 43 connects the interior of the pilot-valve housing with the chamber 32 between the diaphragms. When the electromagnet is deenergized, as shown, the chamber 32 is in communication with the valve inlet 12 through pipe 43, interior of housing 41, open jet 34, and pipe 40. The fluid pressures on opposite sides of diaphragm 22 thus being the same, the closure member 23 rests upon the upper seat 16 due to the force of gravity, and, in the position shown, also due to the fact that the area of the upper surface of the diaphragm exposed to the fluid is larger than that of its exposed under surface—it being assumed that the inlet of the valve is connected to a source of fluid, such as gaseous fuel, under pressure.

When the electromagnet is energized, the interior of the pilot-valve housing, as well as the pressure chamber 32, is closed with respect to the inlet 12 and vented to the atmosphere, so that the fluid pressure below diaphragm 22 effects movement of the closure member 23 in an upward direction until such movement is arrested by the engagement of diaphragm 22 with the other diaphragm 29; the position of diaphragm 29, as shown, being such that the closures 24 and 27 of the closure member are approximately equidistantly spaced from their respective seats 16 and 17, so that the fluid passes relatively unrestrictedly through the opening 15.

By the structure hereinabove described the operation of the main closure member is controlled to effect either complete shut-off or (with the upper diaphragm in the position shown) full flow of fluid. To produce a restricted flow through the valve, means are provided within housing 31 for raising the diaphragm 29 so that the lower diaphragm 22 follows its movements when the pilot valve is energized and accordingly the inlet pressure below diaphragm 22 is urging the same upwardly. These means comprise an expansible-contractible bellows 44 having a hollow stem 45, sealingly threaded in an opening through a side wall of housing 31, to which a thermal bulb 46 is connected by a capillary tube 47. Pivotally mounted at one end on a boss portion 48 of the housing is a lever 49 having a dependent portion 50 from which is a pointed projection 51 which bears in a recess formed in the head 52 of the bellows. The lever is biased downwardly, and against the bellows head, by the force of a compression spring 53 contained in a cup-shaped portion of the top wall of the housing; an adjustable stop-screw 54 cooperating with the free end of the lever to limit its downward movement. The lower end of the dependent portion 50 of the lever is connected by a pivoted link 55 to a rivet 56 which serves to secure stiffening disks 57 at opposite sides of the central portion of diaphragm 29.

In describing the full operation of the valve it will be assumed, by way of example, that it is connected to control supply of fuel to a gas burner for heating a boiler, and that the hot water or steam from the boiler is employed for heating a remote space. Under such conditions the thermal bulb 46 is arranged to respond to the boiler temperature, and energization of pilot valve 33 is controlled by a thermostat responsive to the space temperature and having electrical contacts which are opened when the heating requirement of the space is satisfied.

The positions of the parts as shown in the drawing are those which they assume when the space temperature is above normal, and the boiler temperature has become relatively low due to the shutting-off of the burner—the bellows 44 being so contracted (due to the cooling of the liquid or vapor with which it and the bulb are charged) that the lever rests on the stop 54 and the diaphragm 29 is in its lowermost position. With fall of space temperature the pilot valve 33 is energized and the closure member 23 moves upwardly until it is stopped, by the engagement of diaphragm 22 with diaphragm 29, in its full-flow position wherein the fuel passes through opening 15 past both of seats 16 and 17.

The fuel, ignited at the burner by a pilot burner or other means, produces a high-fire condition of the burner so that the boiler temperature soon rises; the resultant expansion of the bellows 44 effecting, through lever 49 and link 55, upward movement of the diaphragm 29 so that the lower diaphragm 22 also rises due to the fluid pressure below it and the lower closure 27 approaches its seat 17.

In considering the operation of the closure member under the control of the thermal bulb and bellows, it is to be observed that the chamber 30 above diaphragm 29 is continuously in communication with the inlet 12 of the valve, through a pipe 58 branched from pipe 40, so that the fluid pressure acting downwardly on the upper diaphragm is the same as that acting upwardly on the lower diaphragm (the chamber 32 between the diaphragms being at atmospheric pressure). Since the areas of the diaphragms are equal, the opposing forces produced by the fluid pressure are substantially balanced when the closure member is in its middle or full-flow position so that variation of pressure of the source of fluid has no appreciable effect upon the positioning of the closure member, and only a small amount of force need be exerted by the bellows in order to effect movement of the closure member. When the closure member is near its upward limit of movement the forces are somewhat unbalanced due to the fluid pressure acting through opening 15 downwardly on the lower closure 27, but since the area of the same is small with respect to that of the diaphragm the amount of unbalance is correspondingly small. It will be observed that, due to the balance of forces, it is necessary to provide means whereby the lever in its upward movement can lift the upper diaphragm. As shown, the link 55 serves that purpose; however, a spring, constantly maintaining the upper diaphragm in engagement with the lever, could be substituted for the link.

With continued upward movement of the closure 27, due to rise of boiler temperature, flow of fuel to the burner is materially restricted, and if conditions are such that this closure finally reaches its seat 17 the flow through the valve is then solely by way of the restricted opening 18 which is so throttled by the regulating screw 20 as to permit the smallest amount of flow necessary to maintain proper combustion. With fall of boiler temperature, as the bellows correspondingly contracts the force of spring 53, acting through the lever, effects downward movement of the diaphragms and opening of closure 27 so that flow through the valve is increased and reaches its maximum when the lever engages its stop 54. Upon rise of space temperature, the valve is fully closed, as described; and, when the valve is reopened, the closure member assumes such flow-controlling conditions as is determined by the then-existing temperature of the boiler. It will be observed that, upon reopening of the valve, even if the temperature of the boiler is then such that the closure member moves to its restricted-flow position, in so moving it passes through its full-flow position, so that proper ignition of the fuel at the burner is ensured.

While the operation of the valve of the present invention has been described hereinabove in connection with the control of a particular heating system, it will be apparent to those skilled in the art that the valve may be employed in various other ways. For example, in a hot-air heating system the thermal bulb could be arranged to respond to the temperature within the bonnet of the furnace, or to the temperature of the cold-air return. In some systems the thermal bulb could advantageously be subjected to the temperature of the air at the lower level of a room, or to outdoor temperature, or to a temperature which is the resultant component of the hot-air and outdoor temperatures (two bulbs being employed), or to oven range temperature, or to deep-fat fryer temperature.

The specific embodiment of the invention herein shown and described is obviously susceptible of modification without departing from the spirit of the invention, and I intend therefore to be limited only by the scope of the appended claims.

I claim as my invention:

1. In a fluid control valve: a valve casing; a first movable wall closing an opening through a portion of said casing and subjected to the inlet pressure of the fluid controlled by the valve; means for controlling fluid flow through the casing and operated by the movement of said first movable wall; means forming a first chamber continuously subjected to said inlet pressure and defined in part by a second movable wall; means forming a second chamber defined in part by both of the movable walls; means for varying the fluid pressure in said second chamber to move the first movable wall and thereby operate said flow-controlling means; and additional means effective to operate the flow-controlling means when the fluid pressure in said second chamber is less than said inlet pressure, and comprising controllable mechanical means in one of said chambers for moving the second movable wall, and means so interconnecting the movable walls that movement of the second wall effects movement of the first wall, the movable walls being so arranged that the forces produced thereon through said interconnecting means by said inlet fluid pressure on the walls are in opposition and substantially balanced.

2. In a fluid control valve: a valve casing, a first movable wall closing an opening through a portion of said casing and subjected to the inlet pressure of the fluid controlled by the valve, means for controlling fluid flow through the casing and operated by the movement of said first movable wall, means forming a chamber continuously subjected to said inlet pressure and defined in part by a second movable wall arranged in a plane opposite and generally parallel to that of the first movable wall, and controllable mechanical means for moving said second wall so as to engage and move said first wall to operate said flow-controlling means, the areas of said walls being substantially equal so that the forces produced on the walls by said inlet pressure are balanced when the walls are in engagement.

3. In a fluid control valve: a valve casing; a first movable wall closing an opening through a portion of said casing and subjected to the inlet pressure of the fluid controlled by the valve; means for controlling fluid flow through the casing and operated by the movement of said first movable wall; means forming a first chamber continuously subjected to said inlet pressure and defined in part by a second movable wall arranged in a plane opposite and generally parallel to that of the first movable wall; means confining the space between the movable walls so as to form a second chamber; means for varying the fluid pressure in said second chamber to move the first movable wall and thereby operate said flow-controlling means; and additional means effective to operate the flow-controlling means when the fluid pressure in said second chamber is less than said inlet pressure, and comprising controllable mechanical means in one of said chambers for moving the second wall so as to engage and move the first wall, the areas of said walls being substantially equal so that the forces produced on the walls by said inlet pressure are balanced when the walls are in engagement.

4. In a fluid control valve: a valve casing having an inlet and an outlet; a partition separating said inlet and said outlet and having an opening therethrough surrounded at its inlet end by a valve seat; a first flexible diaphragm closing an opening through a portion of the casing facing said valve seat and subjected to the inlet pressure of the fluid controlled by the valve; a closure, carried by said first diaphragm, cooperable with said seat and biased toward engagement therewith; a second flexible diaphragm substantially coextensive with said first diaphragm and arranged in a plane generally parallel thereto; means forming a first pressure chamber defined in part by the surface of said second diaphragm away from said first diaphragm; means joining the margins of said diaphragms to form a second pressure chamber therebetween; means including a pilot valve, for applying said inlet pressure to said second chamber to equalize the pressures on opposite sides of said first diaphragm so that said closure seats under the force of said bias, or for venting the second chamber so that the closure is unseated; means for continuously subjecting said first chamber to said inlet pressure; controllable mechanical means in one of said chambers for moving said second diaphragm; and means carried by said second diaphragm, effective when said second chamber is vented, for engaging and moving said first diaphragm so as to actuate the closure.

5. In a fluid control valve: a valve casing having an inlet and an outlet; a partition separating said inlet and said outlet and having a main opening and a restricted opening, each adapted to interconnect the inlet and the outlet; a closure member for controlling said openings and movable in opposite directions between a first position, wherein both of said openings are closed, and a second position, wherein only said main opening is closed; the arrangement being such that said main opening is open when the closure member is in a third position intermediate said first and second positions; a first movable wall closing an opening through a portion of said casing and subjected to the inlet pressure of the fluid controlled by the valve; means operatively connecting said first wall to said closure member;

means forming a first chamber continuously subjected to said inlet pressure and defined in part by a second movable wall arranged in a plane opposite and generally parallel to that of the first movable wall; means confining the space between the movable walls so as to form a second chamber; means for varying the fluid pressure in said second chamber to move the first movable wall and thereby operate said closure member directly to its first or to its second position; and additional means effective when the closure member is normally in its second position for operating it between its second and third positions, and comprising controllable mechanical means in one of said chambers for moving the second wall, and means so interconnecting the movable walls that movement of the second wall effects movement of the first wall, the movable walls being so arranged that the forces produced thereon through said interconnecting means by said inlet fluid pressure on the walls are in opposition and substantially balanced.

6. In a fluid control valve: a valve casing, a first flexible diaphragm closing an opening through a wall of said casing and subjected to the inlet pressure of the fluid controlled by the valve, means for controlling fluid flow through the casing and operated by the movement of said first diaphragm, a second flexible diaphragm substantially coextensive with said first diaphragm and arranged in a plane opposite and generally parallel thereto, means forming a pressure chamber defined in part by the surface of said second diaphragm away from said first diaphragm, means for continuously subjecting said chamber to said inlet pressure, mechanical means movable in response to variation of the magnitude of a controlling condition for moving said second diaphragm, and means forming a connection whereby movement of the second diaphragm effects movement of the first diaphragm to operate the flow-controlling means, said connection being so arranged that both of the diaphragms are moved in the same direction by said mechanical means through the connection and the effects of the fluid pressures on the diaphragms then neutralize each other.

7. In a fluid control valve: a valve casing, a first flexible diaphragm closing an opening through a wall of said casing and subjected to the inlet pressure of the fluid controlled by the valve, means for controlling fluid flow through the casing and operated by the movement of said first diaphragm, a second flexible diaphragm substantially coextensive with said first diaphragm and arranged in a plane opposite and generally parallel thereto, means forming a first pressure chamber defined in part by the surface of said second diaphragm away from said first diaphragm, means joining the margins of said diaphragms to form a second pressure chamber therebetween, means for varying the fluid pressure in said second chamber so as to move the first diaphragm and thereby operate said flow-controlling means, and additional means effective to operate the flow-controlling means when the fluid pressure in said second chamber is less than said inlet pressure and comprising mechanical means in one of said chambers movable in response to variation of the magnitude of a controlling condition for moving said second diaphragm, as well as means forming a connection whereby movement of the second diaphragm effects simultaneous movement of the first diaphragm in the same direction.

8. In a fluid control valve: a valve casing, a first flexible diaphragm closing an opening through a wall of said casing and subjected to the inlet pressure of the fluid controlled by the valve, means for controlling fluid flow through the casing and operated by the movement of said first diaphragm, a second flexible diaphragm substantially coextensive with said first diaphragm and arranged in a plane opposite and generally parallel thereto, means forming a pressure chamber defined in part by the surface of said second diaphragm away from said first diaphragm, means for continuously subjecting said chamber to said inlet pressure, a fluid pressure operated expansible-contractible member mounted in said chamber and actuated in response to variation of the magnitude of a controlling condition, means operatively connecting said member to said second diaphragm, and means on said second diaphragm engageable with said first diaphragm to move the same and thereby operate said flow-controlling means.

9. A fluid control valve, as defined in claim 8, wherein said expansible-contractible member is so connected to said second diaphragm that expansion of the member effects movement of the second diaphragm in a direction opposite to that in which it is influenced by the fluid pressure in said chamber.

10. In a fluid control valve: a valve casing, a first movable wall closing an opening through a portion of said casing and subjected to the inlet pressure of the fluid controlled by the valve, means for controlling fluid flow through the casing and operated by the movement of said first movable wall, means forming a chamber continuously subjected to said inlet pressure and defined in part by a second movable wall, controllable mechanical means for moving said second movable wall, and means forming a connection whereby movement of said second wall effects movement of the first wall to operate the flow-controlling means, said connection being so arranged that the forces applied to the movable walls by said mechanical means through the connection are in directions aiding and opposing the fluid pressures on the respective walls so that the effects of said pressures then tend to neutralize each other.

WILLIAM A. RAY.

REFERENCES CITED

The following references are of record in the file of this patent:

UNITED STATES PATENTS

| Number | Name | Date |
|---|---|---|
| 2,051,295 | Gauger | Aug. 18, 1936 |
| 2,192,630 | Beam | Mar. 5, 1940 |
| 2,314,266 | Beam | Mar. 16, 1943 |
| 2,317,639 | Ray | Apr. 27, 1943 |
| 2,333,913 | Beam | Nov. 9, 1943 |